United States Patent [19]

Lee

[11] Patent Number: 5,865,310
[45] Date of Patent: Feb. 2, 1999

[54] ARTICLE CONTAINING BOX STRUCTURE

[76] Inventor: Hsiw-Hui Lee, 3 Fl., No. 81, Lane 220, Wu-Hsing St., Taipei City, Taiwan

[21] Appl. No.: 990,412

[22] Filed: Dec. 15, 1997

[30] Foreign Application Priority Data

Oct. 3, 1997 [TW] Taiwan ................................. 86216775

[51] Int. Cl.⁶ .................................................. B65D 85/57
[52] U.S. Cl. ........................ 206/308.1; 206/313; 206/493
[58] Field of Search ............................ 206/307.1, 308.1, 206/308.3, 309–313, 493

[56] References Cited

U.S. PATENT DOCUMENTS

| | | | |
|---|---|---|---|
| 4,844,260 | 7/1989 | Jaw | 206/311 |
| 5,188,228 | 2/1993 | Barrett | 206/313 |
| 5,392,913 | 2/1995 | Merrick | 206/308.1 |
| 5,695,054 | 12/1997 | Weisburn et al. | 206/308.1 |
| 5,697,498 | 12/1997 | Weisburn et al. | 206/308.1 |

Primary Examiner—Paul T. Sewell
Assistant Examiner—Luan K. Bui
Attorney, Agent, or Firm—Bacon & Thomas

[57] ABSTRACT

An article containing box structure including an openable housing composed of two cover bodies, a base seat fixedly disposed in the housing, multiple receiving cartridges pivotally connected on the base seat and multiple clamping plates received in the receiving cartridge for clamping a receiving seat which serves to contain a flat or a solid article. After the cover bodies are opened, the receiving seats can be rotated or inclined by different angles so as to show or take out the article received in the receiving seat seat. A handle is connected with the cover bodies, having a profile identical to the periphery of the cover body. The handle can be slided and drawn out for a user to carry the box. The handle can be retracted to attach to the periphery of the cover body without occupying much room.

6 Claims, 5 Drawing Sheets

ARTICLE CONTAINING BOX STRUCTURE

BACKGROUND OF THE INVENTION

The present invention relates to an article containing box structure including an openable housing composed of two cover bodies, a base seat disposed in the housing and multiple receiving cartridges pivotally connected on the base seat for containing an article. The receiving seats can be rotated or inclined by different angles so as to show or take out the article received in the receiving seat. A handle is retractably connected to the cover bodies for a user to carry the box.

SUMMARY OF THE INVENTION

It is a primary object of the present invention to an article containing box structure including an openable housing composed of two cover bodies, a base seat fixedly disposed in the housing, multiple receiving cartridges pivotally connected on the base seat and multiple clamping plates received in the receiving cartridge for clamping a receiving seat which serves to contain a flat or a solid article. After the cover bodies are opened, the receiving seats can be rotated or inclined by different angles so as to show or take out the article received in the receiving seat.

It is a further object of the present invention to provide the above box structure in which the clamping plate and receiving seat are connected with each other by clamping structure, whereby the receiving seat can be replaced by another receiving seat with different pattern for containing different kinds of articles.

It is still a further object of the present invention to provide the above box structure in which a handle is connected with the cover bodies, having a profile identical to the periphery of the cover body. The handle can be slided and drawn out for a user to carry the box. The handle can be retracted to attach to the periphery of the cover body without occupying much room.

The present invention pan be best understood through the following description and accompanying drawings, wherein:

DETAILED DESCRIPTION OF THE PREFERRED EMBODIMENT

Figure 1:
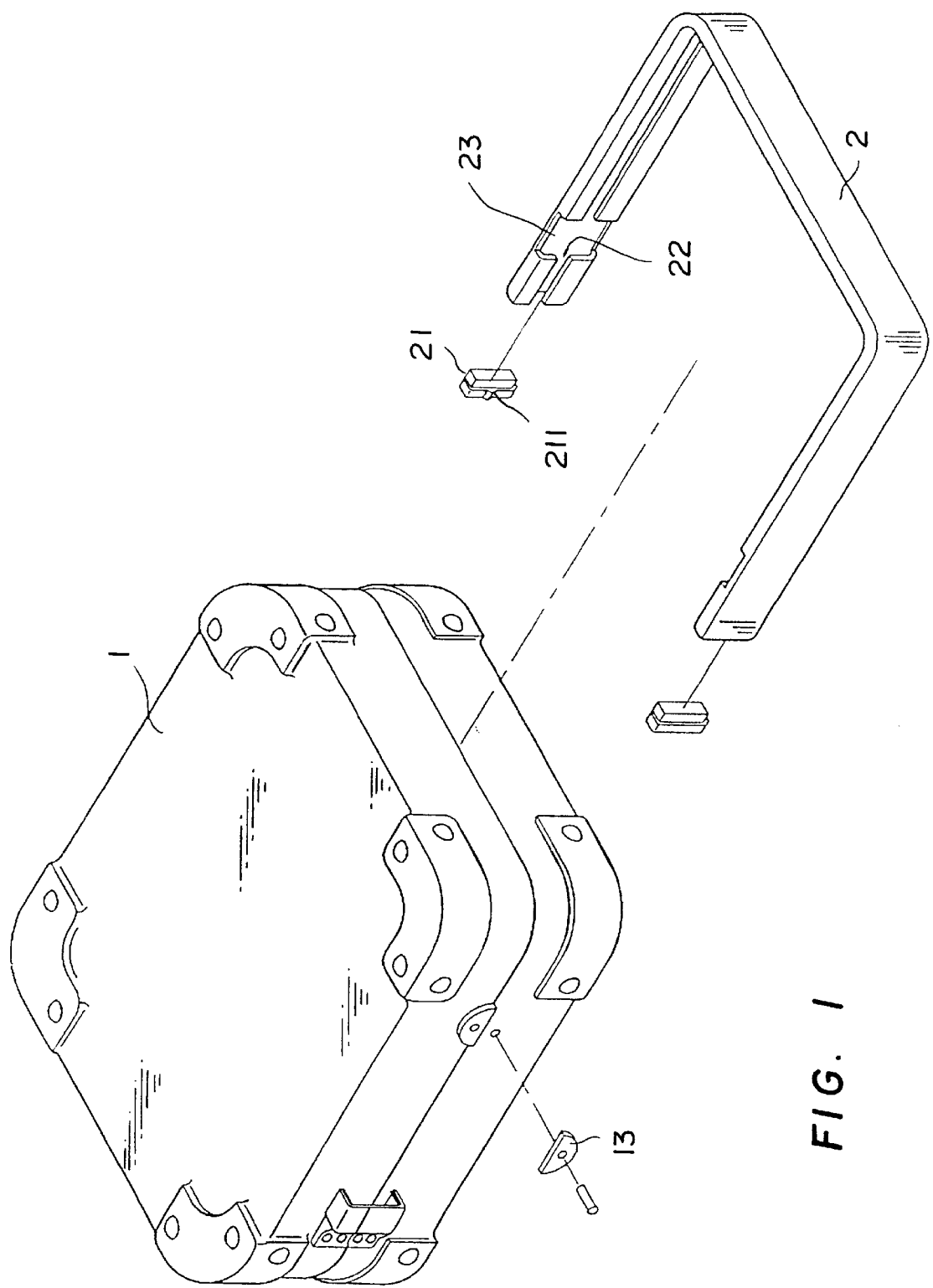
FIG. 1 is a perspective exploded view of the cover bodies and handle of the present invention.
Figure 2:
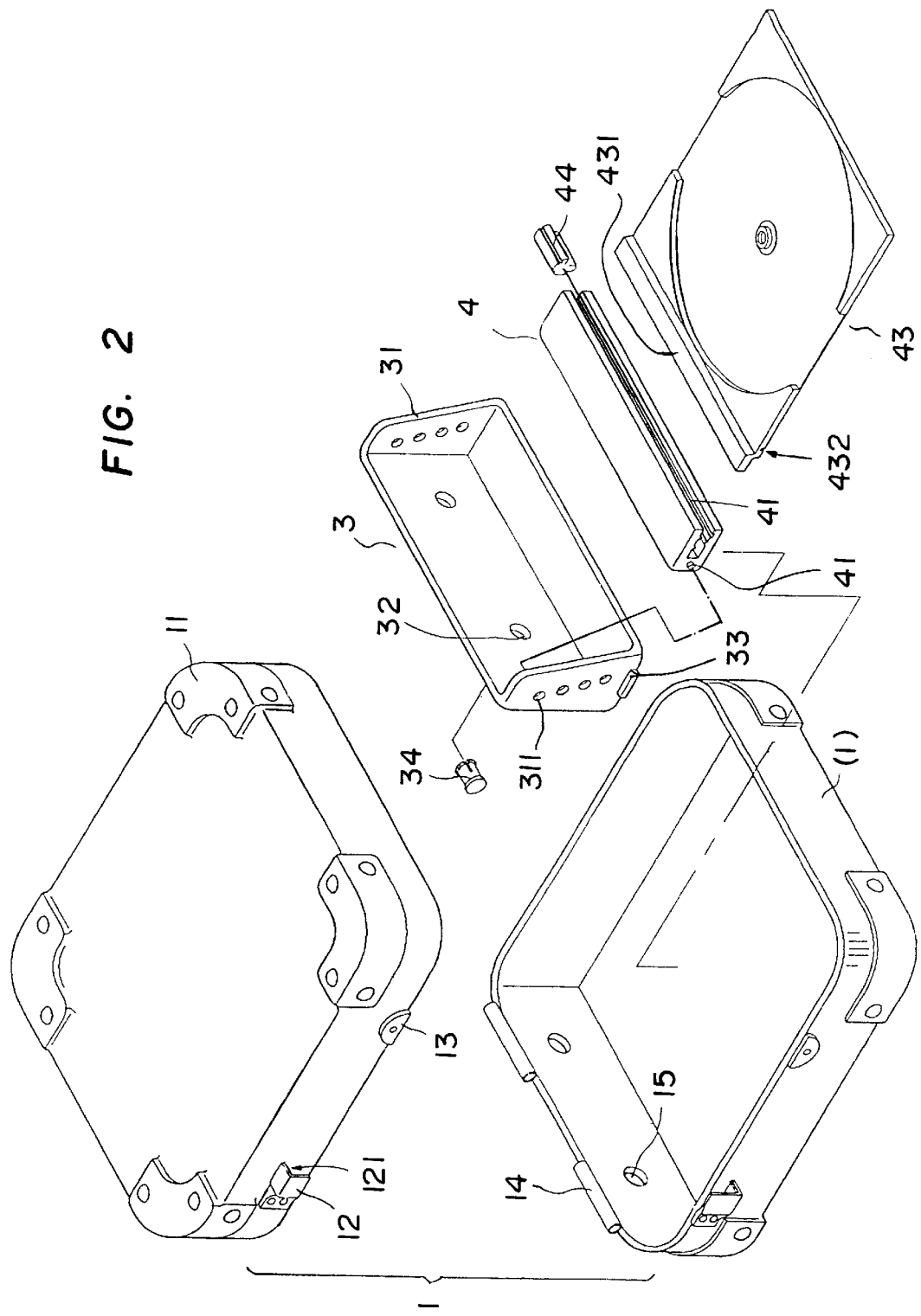
FIG. 2 is a perspective exploded view of the cover bodies, base seat, receiving cartridge and receiving seat of the present invention.
Figure 3:
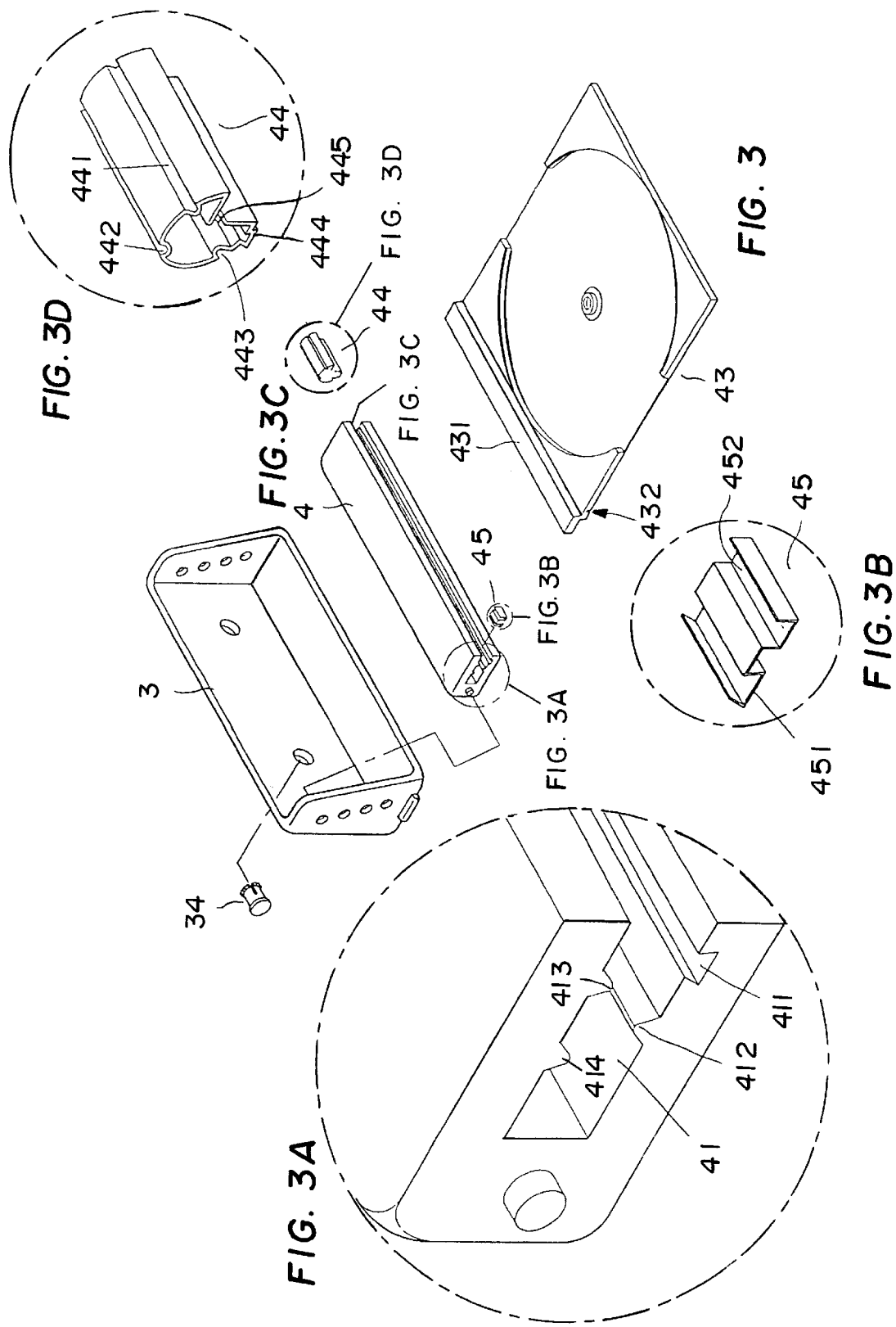
FIG. 3 is an enlarged view showing the receiving cartridge and clamping plate of the present invention.

Please refer to FIGS. 1 to 3. The present invention includes a cover body 1, a handle 2, a base seat 3 and a receiving cartridge 4. The cover body 1 is a container with an opening. One side of the periphery of the opening is disposed with a pivot section 14, whereby two cover bodies 1 can be pivotally connected with each other via the pivot section 14 to form an openable housing. The inner side of the pivot section 14 is disposed with multiple locating holes 15. Each corner of the bottom of the cover body 1 is disposed with a protective edge 11. A semicircular guiding button 13 and an insertion seat 12 are respectively disposed on opposite sides of the periphery of the opening. The insertion seat 12 is formed with an opening facing the guiding button 13. An arch leaf spring 121 is disposed beside the opening. The handle 2 is a U-shaped member two sides of which are inward bent to define a receiving channel 22. The inner side of the handle has the same profile and curvature as the periphery of the cover body 1. Each end of the handle 2 is clogged by a clog 21 having a projection 211 at the end for forming an annular projection after connected with the end of the handle 2. The inner side of each end of the handle 2 is disposed with a notch 23 transversely communicated with the channel 22. A fixing face of the base seat 3 is formed with multiple locating holes 32 corresponding to the locating holes 15. A clog 34 is Passed through the locating holes 32, 15 to connect the base seat 3 with the cover body 1. Two sides of the base seat are disposed with bent edges 31 formed with multiple pivot holes 311 inclinedly straightly arranged. The bottom side of the bent edge 31 is disposed with outward projecting abutting edge 33. Each end of the receiving cartridge 4 is disposed with a tenon 42. One side of the cartridge 4 is formed with a clamping channel 41 between the tenons 42 for receiving a clamping plate 44 or 45 so as to clamp a receiving seat 43. One inner side of the clamping channel 41 is disposed with a dovetail channel 411. A projecting rail 412 is parallelly formed beside the dovetail channel 411. The other side of the clamping channel 41 is disposed with two parallel projecting rails 413, 414. One side of the receiving seat 43 is formed with an outward extending clamping section 431. A lateral inner side of the clamping section 431 is formed with a parallel slit 432. The first clamping plate 44 is substantially cylindrical and made from a plate material by bending. The periphery of the clamping plate is formed with multiple grooves 443, 441, 442 and dovetail rail 444 corresponding to the projecting rails 412, 413, 414 and the dovetail channel 411 of the clamping channel 41. The first clamping plate 44 is formed with a fissure 445 on a lateral side. The second clamping plate 45 is an elongated bar made from a plate material by bending. A lateral side of the clamping plate 45 is formed with a perpendicularly projecting insertion section 452. The other lateral side is bent into a dovetail rail 451.

When assembled, in the case of first clamping plate 44, the clamping section 431 of the receiving seat 43 is inserted into the fissure 445 of the clamping plate 44. The dovetail rail 444 of the clamping plate 44 is fitted into the dovetail channel 411 of the clamping channel 41. Also, the projecting rails 412, 413, 414 of the clamping channel 41 are respectively inserted into the grooves 443, 441, 442 of the clamping plate 44, whereby the clamping plate 44 can firmly clamp and locate the receiving seat 43 in the clamping channel 41. In the case of the second clamping plate 45, the insertion section 452 is first inserted into the slit 432 of the receiving seat 43. Then the dovetail rail 451 of the clamping plate 45 is extended into the dovetail channel 411 of the clamping channel 41. Also, the clamping section 431 of the receiving seat 43 is extended into inner side of the clamping channel 41 without swinging. Therefore, the clamping plate 45 is clamped and restricted by the insertion section 452 and the clamping channel 41 so as to firmly locate the receiving seat 43 in the clamping channel 41.

Figure 4:
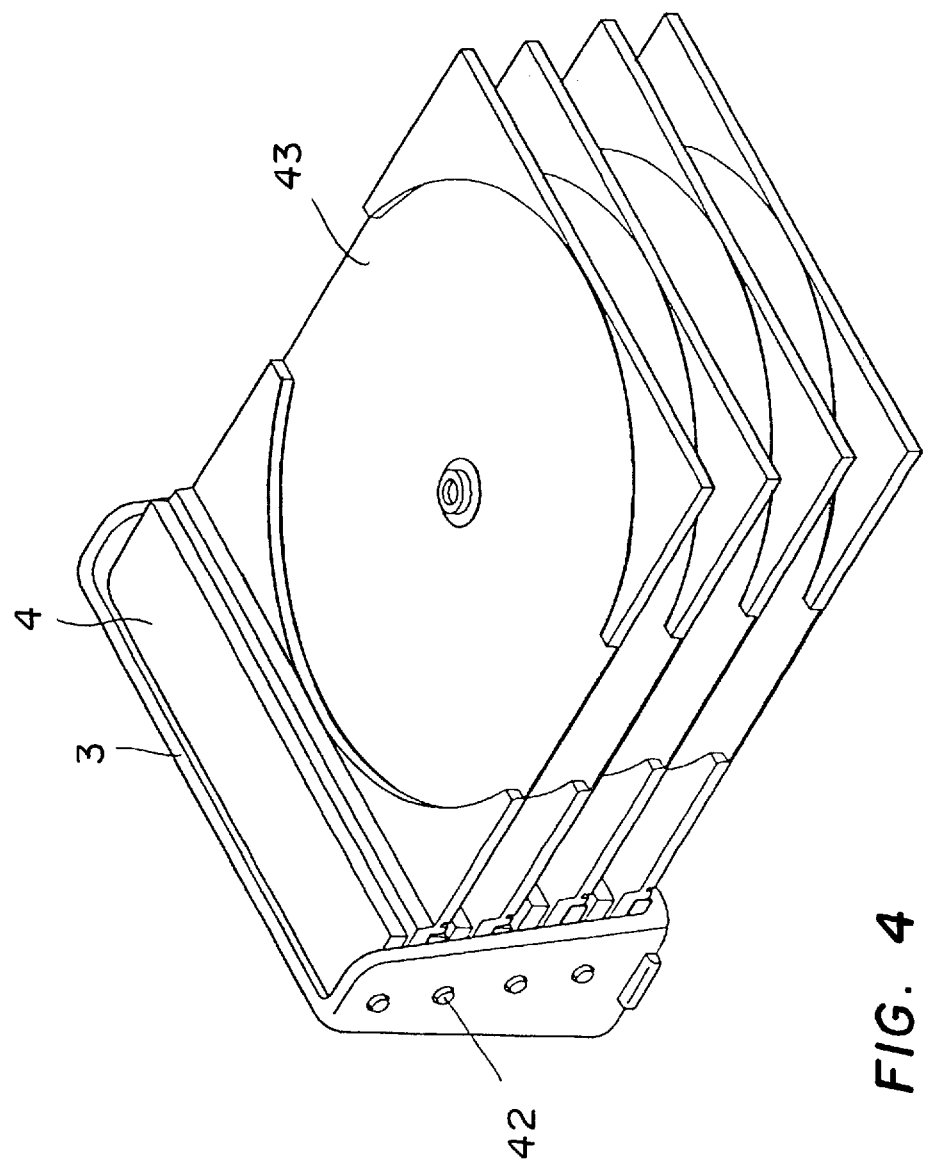
FIG. 4 is a perspective assembled view of the base seat and receiving cartridges and receiving seats of the present invention.

Referring to FIG. 4, after the receiving cartridge 4 and the receiving seat 43 are assembled, the tenons 42 of the receiving cartridge 4 are respectively pivotally inserted into the pivot holes 311 of the base seat 3. Therefore, the receiving seats 43 can be independently rotated and inclined by different angles so as to show or take out an article received in the receiving seat 43.

The receiving seat 43 can have a thin pattern for receiving flat articles. Alternatively, the receiving seat 43 can have larger volume for receiving larger article such as jewels. The receiving seats 43 can be selectively inserted in the pivot holes 311 according to the dimension of the article.

Figure 5:
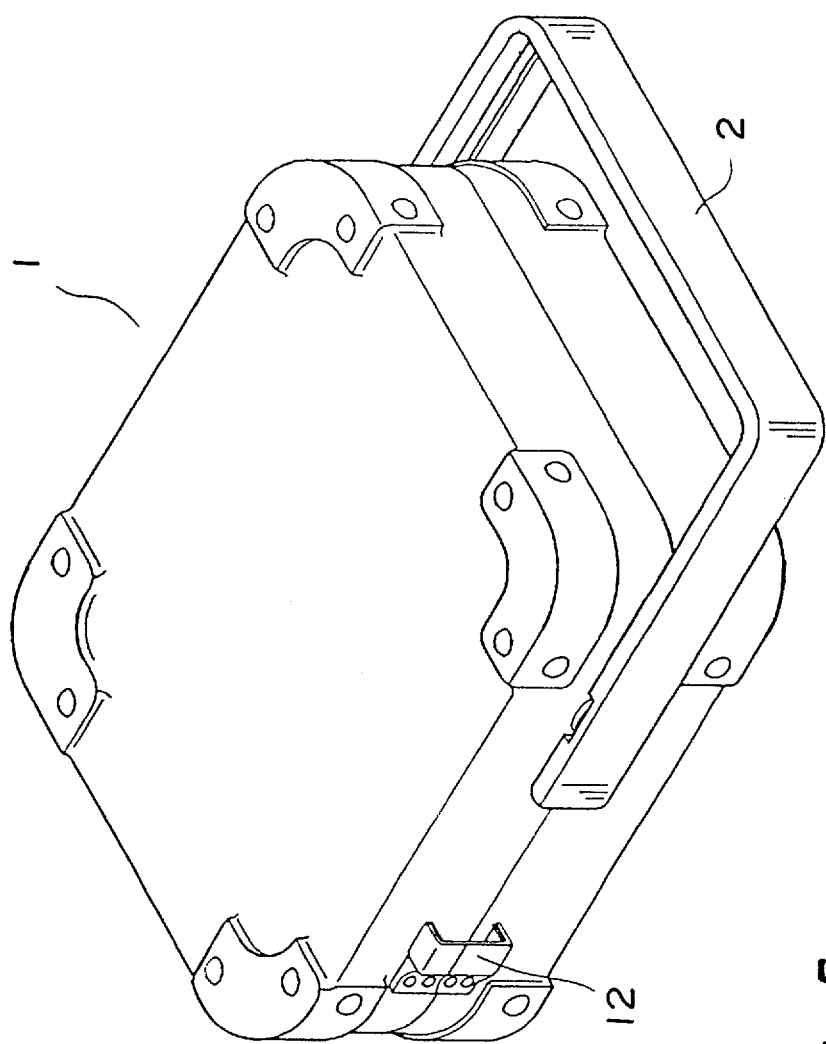
FIG. 5 is a perspective assembled view of the present invention.

Referring to FIG. 5, the notch 23 of the handle 2 is first transversely fitted with the guiding button 13 of the cover body 1 and then longitudinally slided to slidably insert the guiding button 13 into the receiving channel 22 of the handle 2. When the handle 2 is totally outward drawn, the guiding button 13 is relatively slided toward the clog 21 and located therebeside. The handle 2 is also restricted between the protective edges 11 of the cover bodies 1 without tilting for easy holding. When the handle 2 is totally retracted inward, the guiding button 13 is slided within the receiving channel 22 toward the middle section of the handle 2. At this time, the clog 21 is inserted into the insertion seat 12. The leaf spring 121 in the insertion seat 12 is engaged with the projection 211 of the clog 21 so as to lock the handle 2 in a retracted state. When entirely retracted, the handle 2 is hidden in the space between the protective edges 11 without protruding outside.

It should be noted that the above description and accompanying drawings are only used to illustrate some embodiments of the present invention, not intended to limit the scope thereof. Any modification of the embodiments should fall within the scope of the present invention.

What is claimed is:

1. An article containing box structure comprising:

an openable housing composed of two cover bodies each having an opening, one side of the periphery of the opening being disposed with a pivot section, whereby two cover bodies being pivotally connected with each other via the pivot section to form the housing, each corner of the bottom of the cover body being disposed with a protective edge, a guiding button and an insertion seat being symmetrically respectively disposed on opposite sides of the periphery of the opening, the insertion seat being formed with an opening facing the guiding button;

a handle which is a U-shaped member two sides of which are inward bent to define a receiving channel, each end of the handle being clogged by a clog, the inner side of each end of the handle being disposed with a notch transversely communicated with the channel;

a base seat two sides of which are disposed with bent edges formed with multiple pivot holes inclinedly straightly arranged, the bottom side of the bent edge being disposed with outward projecting abutting edge; and a receiving cartridge disposed with a tenon at each end for pivotally inserting into the pivot hole of the base seat, a lateral side of the cartridge being formed with a clamping channel between the tenons for receiving a clamping plate so as to clamp a receiving seat.

2. An article containing box structure as claimed in claim 1, wherein one side of the receiving seat is disposed with a clamping section, one inner side of the clamping channel of the receiving cartridge being disposed with a dovetail channel, a projecting rail being parallelly formed beside the dovetail channel, the other side of the clamping channel being disposed with two parallel projecting rails, the first clamping plate being substantially cylindrical and made from a plate material by bending, the periphery of the clamping plate being formed with multiple grooves and dovetail rail corresponding to the projecting rails and the dovetail channel of the clamping channel, the clamping plate being formed with a fissure on a lateral side for clamping the clamping section of the receiving seat.

3. An article containing box structure as claimed in claim 1, wherein the bottom of one side of the receiving seat is disposed with a slit, a lateral inner side of the clamping channel of the receiving cartridge being disposed with a dovetail channel, the clamping plate being an elongated bar made from a plate material by bending, a lateral side of the clamping plate being formed with a perpendicularly projecting insertion section, the other lateral side being bent into a dovetail rail, the insertion section being inserted into the slit of the receiving seat, the dovetail rail of the clamping plate being extended into the dovetail channel of the clamping channel, the clamping section of the receiving seat being extended into the inner side of the clamping channel so as to firmly locate the receiving seat in the clamping channel.

4. An article containing box structure as claimed in claim 1, wherein the inner side of the pivot section of the cover body is formed with multiple locating holes, a fixing face of the base seat being disposed with multiple locating holes corresponding to the aforesaid locating holes, a clog being fitted into two corresponding locating holes to locate the base seat in the cover body.

5. An article containing box structure as claimed in claim 1, wherein an arch leaf spring is disposed beside the opening of the insertion seat of the cover body, the clog of the handle being formed with a projection, whereby when the end of the handle is inserted into the insertion seat, the leaf spring abuts against the projection to locate the handle.

6. An article containing box structure as claimed in claim 1, wherein the guiding button of the cover body is semicircular for easily sliding within the receiving channel of the handle.

* * * * *